UNITED STATES PATENT OFFICE.

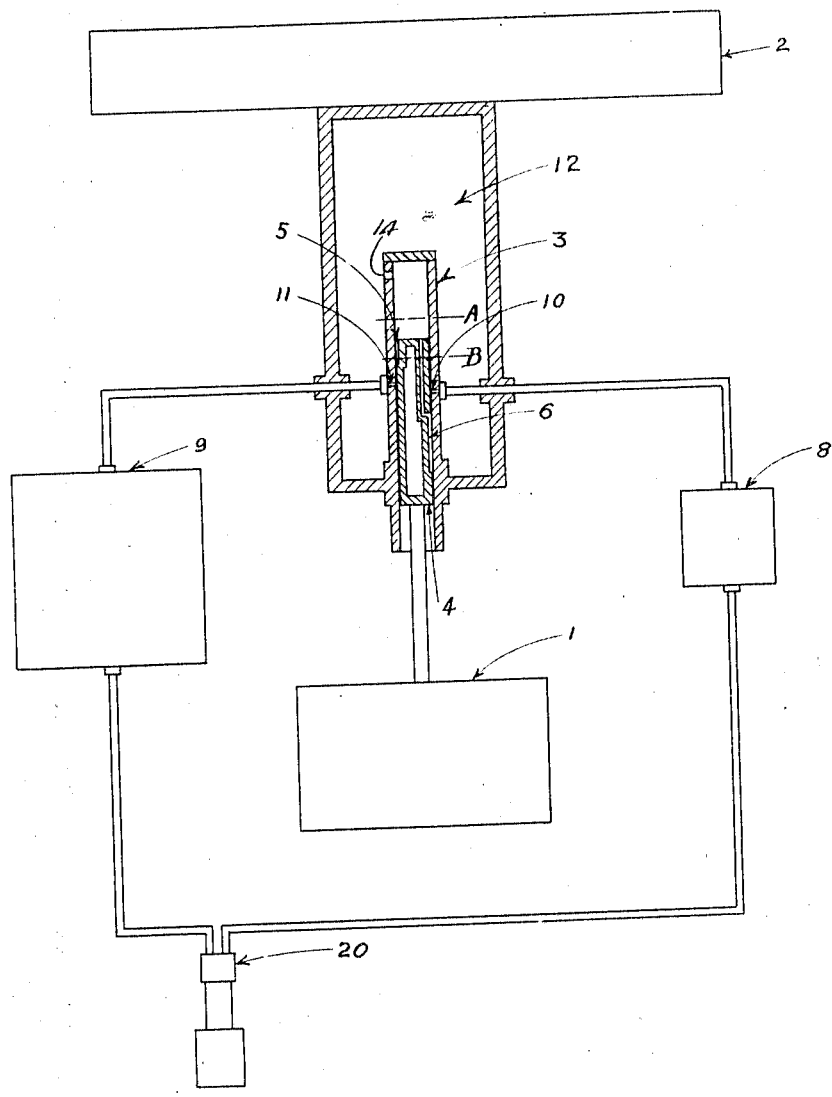

BENJAMIN LIEBOWITZ, OF NEW YORK, N. Y.

VEHICLE SUSPENSION.

1,105,805.  Specification of Letters Patent.  Patented Aug. 4, 1914.

Application filed February 27, 1911. Serial No. 611,253.

*To all whom it may concern:*

Be it known that I, BENJAMIN LIEBOWITZ, a citizen of the United States, residing in the city, county, and State of New York, have invented certain new and useful Improvements in Vehicle Suspensions, of which the following description and claims constitute a specification and which is illustrated in the accompanying drawing.
This invention relates to means for flexibly mounting the body of a vehicle upon the running gear thereof.

The object of this invention is to provide a suspension which will render the suspended body approximately non-oscillatory by the employment of a mechanism constructed to check the free vibrations of the body relative to the running gear without increasing the forced vibrations thereof and which performs its functions satisfactorily without requiring the aid of supplementary devices.

The principle of this invention in whatever mode it is embodied is as follows: The suspended body is rendered approximately non-oscillatory by means of frictional devices which permit of rapid upward motions of the running gear relative to the body without imposing objectionably large forces on said body and which do not appreciably hinder the downward motions of the running gear relative to the said body.

The accompanying drawing is a diagrammatic sectional view of one form of a mechanism embodying my invention.
In practice a plurality of these devices are used to support the body, but here only one is shown.

1 represents the running gear of the vehicle, and 2 represents the body.
3 is a cylinder which is rigidly or otherwise connected to 2, and 4 is a piston which slides in 3 and which is rigidly or otherwise connected to 1. The arrangement of connecting 4 to 2 and 3 to 1 may also be used.
12 is a large chamber in communication with cylinder 3 through opening 14.

3 and 12 are filled with gas under the proper pressure to secure flotational support of the body 2.
8 is a chamber, supplied by the source 20, containing gas under a higher pressure than the pressure in 12.

9 is a space containing gas under a lower pressure than that in 12. The most convenient gas to use is air, and space 9 may then conveniently be the atmosphere.

10 is a small hole in the wall of the cylinder in communication with high pressure space 8. Normally 10 is covered by the piston but when the piston passes inward beyond a predetermined position, which I shall designate as position A in the remainder of the description, 10 is uncovered by slot 6, which is in communication with the interior of cylinder. Hence cylinder 3 is put into throttled communication with the high pressure space 8 when the piston passes inward beyond position A.

11 is another small hole in the wall of the cylinder 3 in communication with low pressure space 9. Normally, 11 is covered by the piston, but when the piston passes outward beyond a predetermined position, which will hereafter be designated as position B, hole 11 is uncovered as by means of slot 5. If opening 11 is put higher, then slot 5 is not necessary. Hence cylinder 3 is put into throttled communication with low pressure space 9 when the piston passes outward beyond position B.
The introduction of friction into vehicle suspensions has been very much misunderstood and this misunderstanding has been one of the chief causes of the failure of suspensions heretofore devised to operate at moderately high or high speeds without employing highly deformable treads. The function which friction in vehicle suspensions has to perform is to render the suspended system non-oscillatory, *i. e.*, to check the free vibrations of the body. Now in any vehicle, as the running-gear moves upward relative to the body, the unbalanced forces impressed on the body are the elastic restoring force plus the friction of the suspension;
and when the running-gear moves downward relative to the body the unbalanced forces acting on the running-gear are gravity plus the total elastic force of the suspension minus the friction of the suspension. Because of these facts, two detrimental effects are produced by the friction when it is not properly applied; (1) the forces impressed on the body by the upward motion of the running-gear become objectionably large, and (2) the quick descent of an upwardly displaced wheel back to the road-bed, which quick descent is necessary for the preservation of traction, is hindered. That is to say, the friction, whose function is to check the free vibrations of the body, increases to a very objectionable extent the forced vibrations of the body, and at the same time lowers the safe limiting speed of the vehicle by retarding the descent of an upwardly displaced wheel to the road-bed, unless the friction is properly applied. All frictional means which possess the characteristic that their friction increases rapidly with the velocity of the running-gear relative to the body will cause these detrimental effects. Such are, for example, liquid dash-pots, and the internal friction, (akin to viscous friction in liquids) inherent in steel springs. Frictional means which do not introduce these detrimental effects are gaseous dash-pots and rubbing surfaces, for example. Such frictional means will hereinafter be designated as "quick-acting frictional means." Hence, by the expression "quick-acting frictional means" is to be understood frictional means which permit rapid upward motions of the running-gear relative to the body without imposing objectionably large forces on the body and which do not hinder to an objectionable extent the downward motions of the running-gear relative to the body. This feature of the employment of quick-acting frictional means in my invention to render the suspended system aperiodic, or approximately so, and keeping all other frictional effects negligibly small throughout the normal range of piston positions, is one of the most important aspects of my invention.

My invention is regarded as including all types of quick-acting frictional means used in connection therewith. That is to say, I do not limit my invention to the use therewith of any particular quick-acting frictional means. The means which I prefer to use, however, is of the gaseous dash-pot type. I obtain the friction on this principle, in the form of my device shown in the drawing by constricting opening 14 to the proper extent and by properly proportioning the cylinder and the chamber 12. For slow motions such as would be due to the free oscillations of the body, gas is forced through opening 14, thus introducing the desired friction to check the free oscillations of the body after the first swing or so, if the various parts are properly proportioned. For rapid motions, however, when the friction would become very large, if the medium were incompressible (as in liquid dashpots), very little gas passes through opening 14, while the compression of the gas, in the cylinder becomes correspondingly larger. Thus the frictional force introduced by this means can never exceed the compression force of the gas in the cylinder 3, and since, by proper proportioning of the cylinder, this compression force can be made as small as desired for ordinary displacements, the frictional forces introduced by this means can easily be kept within required limits for required limits of displacement. In other words, this type of frictional element introduces the friction only for slow motions of the body relative to the running-gear, and it is only for such slow motions that friction is required.

Referring again to the drawing, the size of opening 14 will depend on the ratio of the volume of chamber 12 to volume of the piston displacement; the larger this ratio the larger the holes can be, for then the restoring force per unit displacement is smaller, hence the friction need be less. For certain classes of service, however, a large restoring force per unit displacement is permissible, and therefore, this invention is regarded as including all sizes of chamber 12 in communication with cylinder 3, including no chamber external to the cylinder. In this latter case some other frictional means must be used than the internal gaseous dash-pot described, such as external air dash-pot, or rubbing surfaces.

As shown in the drawing, opening 14 is so placed as to be closed by the piston before it reaches the top, so as to cushion extreme displacements. This opening is shown as a single opening but it can consist of several openings, or of several sets of openings successively closable by the piston as it moves inward, so that for small displacements in the neighborhood of the equilibrium position, communication between chamber and cylinder is less restricted, and greater benefit from the presence of the large chamber can then be derived.

To limit outward displacements, some form of stop is necessary. In practice, it is most convenient to incorporate this stop in the suspension proper or in the external frictional element if one is used.

The arrangement of high and low pressure spaces, holes and slots is to keep the equilibrium position of the body of the vehicle somewhere between position A and position B, independently of the load on the vehicle. For, if there is any tendency for piston 4 to remain inward beyond position A, such as may be due to the addition of load to the vehicle or to leakage, opening 10 will remain uncovered and allow gas to pass from chamber 8 to cylinder 3 till the pressure on piston 4 is sufficiently increased to raise the body high enough to cover opening 10 again. Position A will then be the equilibrium position from which displacements of piston 4 will occur. In the same way, if there is any tendency for the piston 4 to remain outward beyond B, opening 11 will remain uncovered, and gas will be expelled from the cylinder till the body is lowered sufficiently for opening 11 to be closed again. Position B will then be the equilibrium position. When position A is the equilibrium position the movement of the piston due to the wheels passing over the inequalities of the road surface, will uncover opening 10 more than opening 11, hence the equilibrium position will tend to move toward position B. Similarly, when position B is the equilibrium position, it will tend to move toward position A. The latter tendency is increased by leakage, hence it is desirable to have the areas of holes and differences of pressure so proportioned that gas is admitted more rapidly than it is expelled through the holes. Hence, the equilibrium position of the body will always be between position A and position B, independently of the weight of the body.

In the drawing, when the top of the piston touches the line A, the piston is in position A, and when it touches the line B it is in position B. The uncovering of holes 10 and 11 as the piston moves through its range can not affect the main action of the mechanism because changes in pressure due to the passage of gas into or out of the cylinder through the holes will be comparatively slow.

By the term "body of the vehicle" or "body" is to be understood all that mounted on the suspension, and by the term "running-gear" is to be understood all the rest of the vehicle. The terms "non-oscillatory" and "aperiodic" as used in this specification are synonymous, and are to be understood to include "approximately aperiodic" and "approximately non-oscillatory." Chamber 12 will be referred to in the claims as the "additional chamber." The cylinder 3 and the piston 4 will be referred to as the "supporting-cylinder" and the "supporting-piston," respectively.

I am aware that pneumatic and hydropneumatic suspensions, having the same object as this invention, have previously been devised, but these prior inventions either do not consider friction at all, or they do not apply the friction properly when they do consider it, and they have failed very largely because of this fact. I am the first, so far as I am aware, to apply the friction correctly, and for the proper purpose, and in addition, my mechanism for meeting load changes is new, hence

What I claim is:

1. In a suspension for vehicles the following elements in combination: a supporting-piston sliding in a supporting-cylinder; gas in said supporting-cylinder under the proper pressure, normally, to secure flotational support of the body of the vehicle; a high pressure space in communication with a hole in the wall of said supporting-cylinder, which hole is normally covered by said supporting-piston, but which is uncovered by a slot in said supporting-piston when said supporting-piston passes inward beyond a predetermined inward position, said slot being in communication with the interior of said supporting-cylinder; a low pressure space in communication with another hole in the wall of said supporting-cylinder, which hole is normally covered by said supporting-piston, but which is uncovered when said supporting-piston passes outward beyond a predetermined outward position, said inward and outward positions being not coincident, high and low referring to the normal range of pressure in said supporting-cylinder; a gas supply for maintaining the pressure in said high pressure space within the proper range; and quick-acting-frictional means adapted to render the suspended system non-oscillatory or approximately so.

2. In a suspension for vehicles, the following elements in combination: a supporting-piston sliding in a supporting-cylinder; an additional-chamber in communication with said supporting-cylinder; gas in said additional chamber and supporting-cylinder under the proper pressure, normally, to secure flotational support of the body of the vehicle; a high pressure space in communication with a hole in the wall of said supporting-cylinder, which hole is normally covered by said supporting-piston; a slot in said supporting-piston which is in communication with the interior of the said supporting-cylinder and which uncovers said hole when said supporting-piston passes inward beyond a predetermined inward position; a low pressure space in communication with another hole in the wall of said supporting-cylinder, which hole is normally covered by said supporting-piston but which is uncovered when said supporting-piston passes outward beyond a predetermined outward position, said inward and outward positions being not coincident, high and low referring to the normal range of pressure in supporting cylinder, a gas supply for maintaining the pressures in said high pressure space within the proper range; and quick-acting-frictional means adapted to render the suspended system non-oscillatory or approximately so.

3. In a suspension for vehicles, the following elements in combination: a supporting-piston sliding in a supporting-cylinder; an additional-chamber in communication with said supporting-cylinder through ports in the wall of said supporting-cylinder, which ports are closed or almost closed by said supporting-piston before it reaches its inward limit of positions; gas in said additional chamber and supporting-cylinder under the proper pressure, normally to secure flotational support of the body of the vehicle; a high pressure space in communication with a hole in the wall of said supporting-cylinder, which hole is normally covered by said supporting-piston; a slot in said supporting-piston which is in communication with the interior of said supporting-cylinder, and which uncovers said hole when said supporting-piston passes inward beyond a predetermined inward position; a low pressure space in communication with another hole in the wall of said supporting-cylinder, which hole is normally covered by said supporting-piston, but which is uncovered when said supporting-piston passes outward beyond a predetermined outward position, said inward and outward positions being not coincident, high and low referring to the normal range of pressures in said supporting-cylinder; a gas supply for maintaining the pressure in said high pressure space within the proper range; and quick-acting-frictional means adapted to render the suspended system non-oscillatory or approximately so.

4. In a suspension for vehicles the following elements in combination; a supporting piston sliding in a supporting-cylinder; an additional-chamber in communication with said supporting-cylinder through openings in the wall of said supporting-cylinder, which openings are completely or nearly completely closed by said supporting-piston before it reaches its limit or inward positions, gas in said additional chamber and supporting-cylinder under the proper pressure, normally, to secure flotational support of the body of the vehicle; a high-pressure space in communication with a hole in the wall of said supporting-cylinder, which hole is normally covered by said supporting-piston; a slot in said supporting-piston which is in communication with the interior of said supporting-cylinder and which uncovers said hole when said supporting-piston passes inward beyond a predetermined inward position; a low pressure space in communication with another hole in the wall of said supporting-cylinder, which hole is normally covered by said supporting-piston, but which is uncovered when said supporting-piston passes outward beyond a predetermined outward position, said inward and outward positions being not coincident, high and low referring to the normal range of pressures in said supporting-cylinder; and a gas supply for maintaining the pressure in said high pressure space within the proper range.

5. In a suspension for vehicles, the following elements in combination; a supporting-piston sliding in a supporting-cylinder; an additional-chamber in communication with said supporting-cylinder; gas in said additional chamber and supporting-cylinder under the proper pressure, normally, to secure flotational support of the body of the vehicle; a high pressure space in communication with a hole in the wall of said supporting-cylinder, which hole is normally covered by said supporting-piston; a slot in said supporting-piston which is in communication with the interior of said supporting-cylinder and which uncovers said hole when said supporting-piston passes inward beyond a predetermined inward position; a low pressure space in communication with another hole in the wall of said supporting-cylinder, which hole is normally covered by said supporting-piston, but which is uncovered when said supporting-piston passes outward beyond a predetermined outward position, said inward and outward positions being not coincident, high and low referring to the normal range of pressures in said supporting-cylinder; and a gas supply for maintaining the pressure in the high pressure space within the proper range.

6. In a suspension for vehicles, and for other applications, the following elements in combination; a piston sliding in a cylinder; gas in said cylinder under the required normal pressure; a high pressure space in communication with a hole in the wall of said cylinder, which hole is normally covered by said piston; a slot in said piston which is in communication with the interior of said cylinder, and which uncovers said hole when said piston passes inward beyond a predetermined inward position; a low pressure space in communication with another hole in the wall of said cylinder, which hole is normally covered by said piston, but which is uncovered when said piston passes outward beyond a predetermined outward position, said inward and outward position being not coincident, high and low referring to the normal range of pressures in said cylinder, and a gas supply for maintaining the pressure in the high pressure space within the proper range.

7. In a suspension for vehicles, the following elements in combination; a supporting-piston sliding in a supporting-cylinder; an additional-chamber in communication with said supporting-cylinder; gas in said additional-chamber and supporting-cylinder under the proper pressure, normally, to secure flotational support of the body of the vehicle; a high pressure space which is put into throttled communication with said supporting-cylinder when said supporting-piston passes inward beyond a predetermined inward position; a low pressure space which is put into throttled communication with said supporting-cylinder when said supporting-piston passes outward beyond a predetermined outward position, said inward and outward positions being not coincident, high and low referring to the normal range of pressures in said supporting-cylinder; a gas supply for maintaining the pressure of the high pressure chamber within the proper range; and quick-acting-frictional means adapted to render the suspended system non-oscillatory or approximately so.

8. In a suspension for vehicles, the following elements in combination; a supporting-piston sliding in a supporting-cylinder; an additional-chamber in communication with said supporting-cylinder through openings in the wall of said supporting-cylinder, which openings are completely or nearly completely closed by said supporting-piston before it reaches its inward limit of positions; gas in said additional chamber and supporting-cylinder under the proper pressure, normally, to secure flotational support of the body of the vehicle; a high pressure space which is put into throttled communication with said supporting-cylinder when said supporting-piston passes inward beyond a predetermined inward position; a low pressure space which is put into throttled communication with said supporting-cylinder when said supporting-piston passes outward beyond a predetermined outward position, said inward and outward positions being not coincident, high and low referring to the normal range of pressures in said supporting cylinder; a gas supply for maintaining the pressure in the high pressure space within the proper range; and quick-acting-frictional means adapted to render the suspended system non-oscillatory or approximately so.

9. In a suspension for vehicles, the following elements in combination; a supporting-piston sliding in a supporting-cylinder; an additional chamber in restricted communication with said supporting-cylinder, whereby the proper amount of friction is introduced to render the suspended system non-oscillatory or approximately so, all other frictional forces being small compared with the gas-pressure forces throughout the normal range of piston positions; gas in said additional chamber and supporting-cylinder under the proper pressure, normally, to secure flotational support of the body of the vehicle; a high pressure space which is put into throttled communication with the said supporting-cylinder when said supporting-piston passes inward beyond a predetermined inward position; a low pressure space which is put into throttled communication with said supporting-cylinder when said supporting-piston passes outward beyond a predetermined position, said inward and outward positions being not coincident, high and low referring to the normal range of pressures in said supporting-cylinder; and a gas supply for maintaining the pressure in the high pressure space within the proper range.

In testimony whereof, I have hereunto affixed my signature in the presence of two subscribing witnesses.

BENJAMIN LIEBOWITZ.

Witnesses:
   CECIL B. RUSKAY,
   JACOB N. PASCO.